US010762509B2

(12) United States Patent
Cristofalo et al.

(10) Patent No.: US 10,762,509 B2
(45) Date of Patent: *Sep. 1, 2020

(54) ASSET TARGETING SYSTEM FOR LIMITED RESOURCE ENVIRONMENTS

(71) Applicant: INVIDI Technologies Corporation, Princeton, NJ (US)

(72) Inventors: Michael Cristofalo, Doylestown, PA (US); Patrick M. Sheehan, Jamison, PA (US)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,943

(22) Filed: Oct. 29, 2018

(65) Prior Publication Data

US 2019/0303947 A1 Oct. 3, 2019

Related U.S. Application Data

(63) Continuation of application No. 15/907,009, filed on Feb. 27, 2018, now abandoned, which is a continuation of application No. 12/913,338, filed on Oct. 27, 2010, now Pat. No. 9,904,925, which is a continuation of application No. 12/022,209, filed on Jan. 30, 2008, now Pat. No. 7,849,477.

(60) Provisional application No. 60/887,300, filed on Jan. 30, 2007.

(51) Int. Cl.
| | |
|---|---|
| G06Q 30/00 | (2012.01) |
| H04H 60/20 | (2008.01) |
| H04H 20/10 | (2008.01) |
| G06Q 30/02 | (2012.01) |
| H04H 60/37 | (2008.01) |
| H04H 60/31 | (2008.01) |

(52) U.S. Cl.
CPC ............ *G06Q 30/00* (2013.01); *G06Q 30/02* (2013.01); *H04H 20/10* (2013.01); *H04H 60/375* (2013.01); *H04H 60/31* (2013.01)

(58) Field of Classification Search
CPC .. H04N 21/2353; H04N 21/236; H04N 21/25; H04N 21/252; H04N 21/254; H04N 21/258; H04N 21/25808; H04H 20/10; H04H 60/31; H04H 60/375; G06Q 30/02
USPC ......... 725/9, 12, 14, 16, 22, 32, 34, 35, 105
See application file for complete search history.

(56) References Cited

U.S. PATENT DOCUMENTS

| | | | | |
|---|---|---|---|---|
| 5,550,928 A | * | 8/1996 | Lu ....................... | G06K 9/00221 382/103 |
| 2002/0083442 A1 | * | 6/2002 | Eldering ................ | H04N 7/165 725/34 |
| 2007/0261072 A1 | * | 11/2007 | Boulet ................... | G06Q 30/02 725/14 |

* cited by examiner

*Primary Examiner* — Dominic D Saltarelli
(74) *Attorney, Agent, or Firm* — Davis Graham & Stubbs LLP

(57) ABSTRACT

The present invention provides targeted asset system implementations in contexts where there is limited or no ability to use a real-time return channel for communications from user equipment devices (e.g., STB) to the network. In one arrangement, a household classifier is generated and delivered to user equipment devices. The household classifiers are generated based on third party data and/or network usage information associated with the household. The system and method allow for generating highly accurate household classifications that may be forwarded to individual households where the user equipment device may implant the classifiers to select appropriate assets for delivery to the household.

15 Claims, 10 Drawing Sheets

ASSET TARGETING SYSTEM FOR LIMITED RESOURCE ENVIRONMENTS

CROSS-REFERENCE TO RELATED APPLICATION

This application is a continuation of U.S. application Ser. No. 15/907,009 having a filing date of Feb. 27, 2018, which is a continuation of U.S. application Ser. No. 12/913,338 having a filing date of Oct. 27, 2010, which is a continuation of U.S. application Ser. No. 12/022,209 having a filing date of Jan. 30, 2008, and claims priority under 35 U.S.C. 119 to U.S. Provisional Application No. 60/887,300 filed on Jan. 30, 2007. The contents of all of these applications are incorporated by reference herein as if set forth in full.

FIELD

Systems and methods presented herein relate to the provision of targeted assets via a network interface. In one specific arrangement, individualized classifiers are provided to individual households of a broadcast network, wherein user equipment of each individual household may utilize the provided classifier(s) to select among assets provided via the network interface.

BACKGROUND

Broadcast network content or programming is commonly provided in conjunction with associated informational content or assets. These assets include advertisements, associated programming, public-service announcements, ad tags, trailers, weather or emergency notifications and a variety of other content, including paid and unpaid content. In this regard, assets providers (e.g., advertisers) who wish to convey information (e.g., advertisements) regarding services and/or products to users of the broadcast network often pay for the right to insert their information into programming of the broadcast network. For instance, advertisers may provide ad content to a network operator such that the ad content may be interleaved with broadcast network programming during one or more programming breaks. The delivery of such paid assets often subsidizes or covers the costs of the programming provided by the broadcast network. This may reduce or eliminate costs borne by the users of the broadcast network programming.

In order to achieve a better return on their investment, asset providers often try to target their assets to a selected audience that is believed to be interested in the goods or services of the asset provider. The case of advertisers on a cable television network is illustrative. For instance, an advertiser or a cable television network may target its ads to certain demographic groups based on, for example, geographic location, gender, age, income etc. Accordingly, once an advertiser has created an ad that is targeted to a desired group of viewers (e.g., targeted group) the advertiser may attempt to procure insertion times in the network programming when the targeted group is expected to be among the audience of the network programming.

Various asset targeting systems have been proposed in the context of targeting ads to individual network users in a cable television network. In one implementation, the asset targeting system is capable of determining classification parameters of a current viewer. Specifically, the system analyzes a click stream (remote control or other inputs) from the user and, optionally, other information to determine demographic or other information regarding the current user. This information can be utilized by a user equipment device (e.g., set top box) to identify appropriate ads for an upcoming commercial spot in a process called voting. In such an arrangement, one or more user equipment devices may report current user information to a network platform such that ads better targeted to current network users may be selected for broadcast. Additionally, this information can be used to select an appropriate ad, from a set of ads available for a given commercial spot, to be delivered at a set top box ("STB"). The ads that are actually delivered at the STB television can be reported to the network.

SUMMARY

In view of the above, the inventors of the current systems and methods have recognized that, in many environments such a voting process may not be feasible or desirable. That is, there are a number of situations in which it may be desired or necessary to function with more limited resources. For example, in some cases, such as a satellite television network, there may be very limited or no opportunity to use a return channel for communications from user equipment devices (e.g., STB, DVR etc.) to the network. Accordingly, it may not be practical to implement real-time voting and/or reporting processes as described above.

In addition, in some cases the resources available at the STB may be limited. For example, other applications or constraints imposed by network providers may limit the STB resources that can be utilized by the targeted asset system. In such cases, it may be necessary or useful to employ reduced functionality or to shift functionality implementation from the STB to another network platform. Finally, in some cases, a network provider or other party operating the targeted asset system may be content to implement targeting on a household basis rather than based on a determination made at the household regarding who is currently using the network. In such cases, it may be elected to implement a targeted asset system with reduced functionality or to re-distribute functionality across the network. The present invention provides targeted asset system implementations useful in the noted contexts.

According to a first aspect, a system and method (i.e., utility) is presented for use in targeting broadcast network content (e.g., assets) wherein household classifiers are generated by the network and delivered to individual households. In this regard, user equipment devices at the individual households may utilize the classifiers to select among asset options, provided by the broadcast network, for presentation to the household. The utility includes providing a network platform for processing household classifiers for delivery to the user equipment devices. The network platform is operative to obtain household information from at least one information repository for individual households in the broadcast network. The network platform is also operative to receive network usage information that originates from those individual households. Based on this information, the platform is operative to generate at least one household classifier based on correlated household information and network usage information. Once one or more household classifiers are generated, these classifiers may be delivered to one or more user equipment devices at such households. Accordingly, the user equipment devices at each such household may use the household classifier to select assets for delivery with broadcast content output at each household. In this regard, it will be appreciated that targeted household classifiers may be provided to individual households such that the households may select asset options that are most appropriate for the individual household.

Generally, household information may be obtained from any information repository, including, without limitation, third party databases. Such third party databases may include information that is associated with the network user households. This information may include purchasing information (e.g., credit card purchases), credit information, household composition, segmentation model clusters, and even information about individual household members. Such household information may be utilized to determine actual member and/or putative members and/or demographics of the household. Accordingly, once putative members and/or demographics of the household are identified, one or more predetermined household classifications may be selected for that household. For instance, a household that has recently purchased diapers may be classified as a family having young children.

In order to correlate household information from one or more information repositories with network usage information, customer database information may be obtained. Such customer database information may be obtained that includes customer specific information associated with individual households. Such information may include, without limitation, location of individual households, one or more names of individuals associated with the household and/or demographic information associated with individuals in the household. Customer database information may originate from a network provider or from an asset provider. In the former case, such information may be directed primarily toward, for example, billing information, which may include location information and one or more names. However, such network provider customer information may contain additional demographic information as well. In the case of asset provider customer information, such customer information may be very detailed. For instance, an auto manufacturer may have highly specific demographic information for their previous customers. Accordingly, this information may be utilized for targeting assets. However, it will be appreciated that such customer information may be limited for use with targeting assets of the asset provider. In any arrangement, customer information from such customer database(s) may be utilized in conjunction with the household information and/or network usage information to generate the household classifiers.

The network usage information may include information associated with usage patterns of the households. For instance, such information may include temporal information associated with usage times that a user equipment device of the household is outputting network content. Further, such usage information may include band or channel or information associated with a broadcast content stream that is being output to the household. In one arrangement, such network usage information may be obtained from a database of network usage information. Such a database may be accessible by the platform via one or more communications links or may be integrated with the platform.

In an arrangement where a network usage database is utilized, the database may include previously received and stored usage information. That is, user equipment devices may report usage information to a database that may subsequently be accessed by the platform for use in generating household classifiers. In such an arrangement, the user equipment devices may report to the database on a predetermined schedule (e.g., periodically, daily, weekly, etc.). Further, user equipment devices may report to the database via any available communications interfaces. Such communications interfaces may include the network interface utilized to receive broadcast content. In another arrangement, such an interface may utilize a communications system separate from the broadcast network. For instance, the user equipment devices may use a telephonic interface and/or packet switch network interface (e.g., internet interface). In a further arrangement, where communications between the user equipment device and the network platform are possible in real time, such network usage information may be received directly at the platform from the user equipment device. This may allow, in some arrangements, for selecting a household classifier based on current usage conditions.

Household classifications may be separated into any definable classifications. Often, these classifications may be based on one or more of the following including, without limitation, gender, age, income, geographic location, and/or personal interest. Further, the utility may be operative to identify a number of classifications for a given household. That is, upon identifying a number of different putative members of the household and/or usage times that may be associated with different household members, first and second (or more) household classifiers may be generated for delivery to the user equipment device. In such an arrangement, temporal limitations for use with the different classifiers may be identified. In such an arrangement, a first classifier may be utilized during a first time period (e.g., morning) when a first putative member of the household is expected to be receiving broadcast content, and a second classifier may be utilized at a second time period (e.g., evening) when a second putative member of the household is expected to be receiving broadcast content.

In a further arrangement, different classifiers may be delivered to different user equipment devices of a common household. In this regard, it has been recognized that different user equipment devices may have different usage patterns. Stated otherwise, different user equipment devices may be primarily utilized by different members of the household (e.g., a dominant viewer of a particular television). In one arrangement, a dominant viewer classifier may be generated and implemented for one or more user equipment devices of a multi-user equipment device household.

In addition to generating household classifiers based on the network usage information, it will be appreciated that such network usage information may be updated. In this regard, upon receiving updated usage information, the utility may generate updated household classifiers and deliver those updated classifiers to one or more user equipment devices at the household.

In a further arrangement, the utility may be operative to receive report usage information from multiple user equipment devices associated with a common household. In such an arrangement, different household classifiers may be generated and provided to different user equipment devices of a common household.

The household classifiers may be utilized by the user equipment devices in a number of different ways. In a first arrangement, the household classifier(s) may be utilized to selectively store assets received from the network. That is, as assets are received, a determination may be made if they are appropriate for the household. Appropriate assets may then be stored to local storage media and subsequently inserted into a content stream for delivery to the household. In an alternate arrangement, the household classifier(s) may be utilized to select between different assets provided in conjunction with broadcast content. For instance, the household classifier may be utilized to select between assets provided on separate transmission bands during an asset delivery spot in order to provide an asset that is most appropriate for the household.

According to another aspect, a system and method (i.e., utility) is provided for use in a user equipment device that allows reporting network usage information for use in generating a household classifier, as well as implementing such a household classifier to select assets for the household. The utility is operative to record network usage information associated with broadcast network content output at a household. Such network usage information may be recorded to computer readable storage media associated with the user equipment device. At a predetermined time or, upon request, this network user information of the user equipment device may be transmitted to a platform or database that is accessible via the broadcast network. A platform in the network may be operative to utilize the network usage information to generate a household classifier. In turn, the utility may receive and store such a household classifier. Accordingly, the user equipment device may subsequently utilize a household classifier to select assets for delivery with broadcast content received via a broadcast network interface.

This process of recording network usage history, transmitting the network usage history to a network platform or database and receiving a household classifier may be repeated. In this regard, updated household classifiers may be received, for example, based on changes in network usage of the household. Further, it will be appreciated that a plurality of household classifiers may be received from the network and may be implemented in accordance with specified limitations (e.g., temporal limitation and/or transmission band limitation) provided with the household classifiers.

Typically, the utility is operative to compare at least one constraint associated with an asset received via the network interface with at least one classification parameter associated with the household classifier. Upon identifying a match between the constraint and the classification parameter, the utility may be operative to either store an asset to storage media associated with the device, select an asset from storage media associated with the device and/or switch between transmission bands of an incoming content stream in order to provide a suitable asset to household users receiving an output from the user equipment device.

In order to identify upcoming asset insertion opportunities, the utility may further include a decoder that is operative to receive and decode a signal associated with a received broadcast stream. Accordingly, this decoder may be operative to identify upcoming asset insertion opportunities, as well as constraints that may be associated with those asset insertion opportunities. Based on these constraints, the user equipment device may select an appropriate asset from storage and/or switch between transmission bands of the content stream. In the latter regard, it will be appreciated that the user equipment may require a selector for changing transmission bands at the beginning of an asset delivery spot and returning to the original transmission band at the end of the asset delivery spot.

The utility includes an input interface structure for use in receiving network content from the broadcast network. This input interface structure may also be utilized to receive a household classifier(s). In a further arrangement, the utility includes an output interface structure for transmitting network usage information to the network. In various arrangements, the input interface structure and output interface structure may be a common structure. In other arrangements, the input interface structure and the output interface structure may be separate. For instance, the output interface structure may utilize a separate communications network for use in delivering network usage information to, for example, a network platform, database or other data repository. In one arrangement, the second interface may comprise a telephonic interface and/or a packet switched network interface.

According to another aspect, a plurality of classifiers may be generated within the network for a given household. Based on information received from the given household, one of those classifiers may be selected and sent to the user equipment device at the household. In such a utility, a network platform may be provided for processing household classifiers for delivery to the user equipment devices. Accordingly, the network platform may be operative to obtain household information for the household from at least one information repository. Based on this household information, a plurality of household classifiers may be generated. Subsequently, current network usage information may be received that originates from the household. Based on this current network usage information, one of the plurality of household classifiers may be selected and delivered to the user equipment device of the household. The user equipment device may subsequently utilize this classifier for use in selecting assets for delivery to the current user of the user equipment device.

In one arrangement, the current network usage information may be received via the interface that is utilized to provide the broadcast content to the user equipment device. In another arrangement, a separate communications interface may be utilized to receive the current network usage information.

Generating a plurality of classifiers may be performed by generating classifiers based on information associated with third party databases, customer databases or other information repositories. In this regard, putative members of the household may be identified. Such information may be further combined with statistical usage patterns of similarly situated households. Accordingly, temporal limitations and/or network band/channel limitations may be implemented for different classifiers.

In a further arrangement, different classifiers may be generated for different user equipment devices of a common household. In this regard, network usage information may be identified for two or more user equipment devices of a single household. In this regard, it will be appreciated that different user equipment devices may be utilized by different members of the household. Accordingly, different classifiers may be implemented the different user equipment devices to better target individual members of the household. In one arrangement, a dominant user is identified for each user equipment device. This dominant user may be identified using network usage information as well as household information associated with the household. In one arrangement a single classifier associated with the dominant user may be continuously implemented by the user equipment device.

According to another aspect, a system and method (i.e., utility) is provided for improving the identification of a current network user. Such utility may be implemented at a user equipment device of a household in a broadcast network. Initially, the user equipment device may receive household information associated with members of the household. Subsequently, the user equipment device may receive an input from a user of the user equipment device (e.g., a household member). Based on this input and the household information, the utility may identify one of the members of the household as being the current user of the user equipment device. Accordingly, the utility may select assets for delivery with broadcast content based on the identified current user of the user equipment device.

In one arrangement, receiving household information may include receiving putative household member information. That is, third-party data that has been processed or may be processed to determine putative members of the household may be provided from the broadcast network to the user equipment device. Alternatively, household membership information associated with actual/identified members of the household may be provided to the user equipment device. Accordingly, the user equipment device may utilize one or more stored algorithms to select amongst, for example, predetermined classification parameters associated with members of the household. For instance, based on a click stream received by user input device, the utility may determine which of the household members is most likely currently receiving network content from the user equipment device. Accordingly, once the current user is identified, assets may be selected (e.g., from storage, from asset channels, etc.) that are targeted to the current user.

DETAILED DESCRIPTION

The present invention relates to various structure and functionality for delivery of targeted assets in a communications network, as well as associated business methods. The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention may make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of satellite television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets may include, without limitation, advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed/interleaved with untargeted programming (e.g., provided during programming breaks) or may otherwise be combined with the programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

Figure 1:
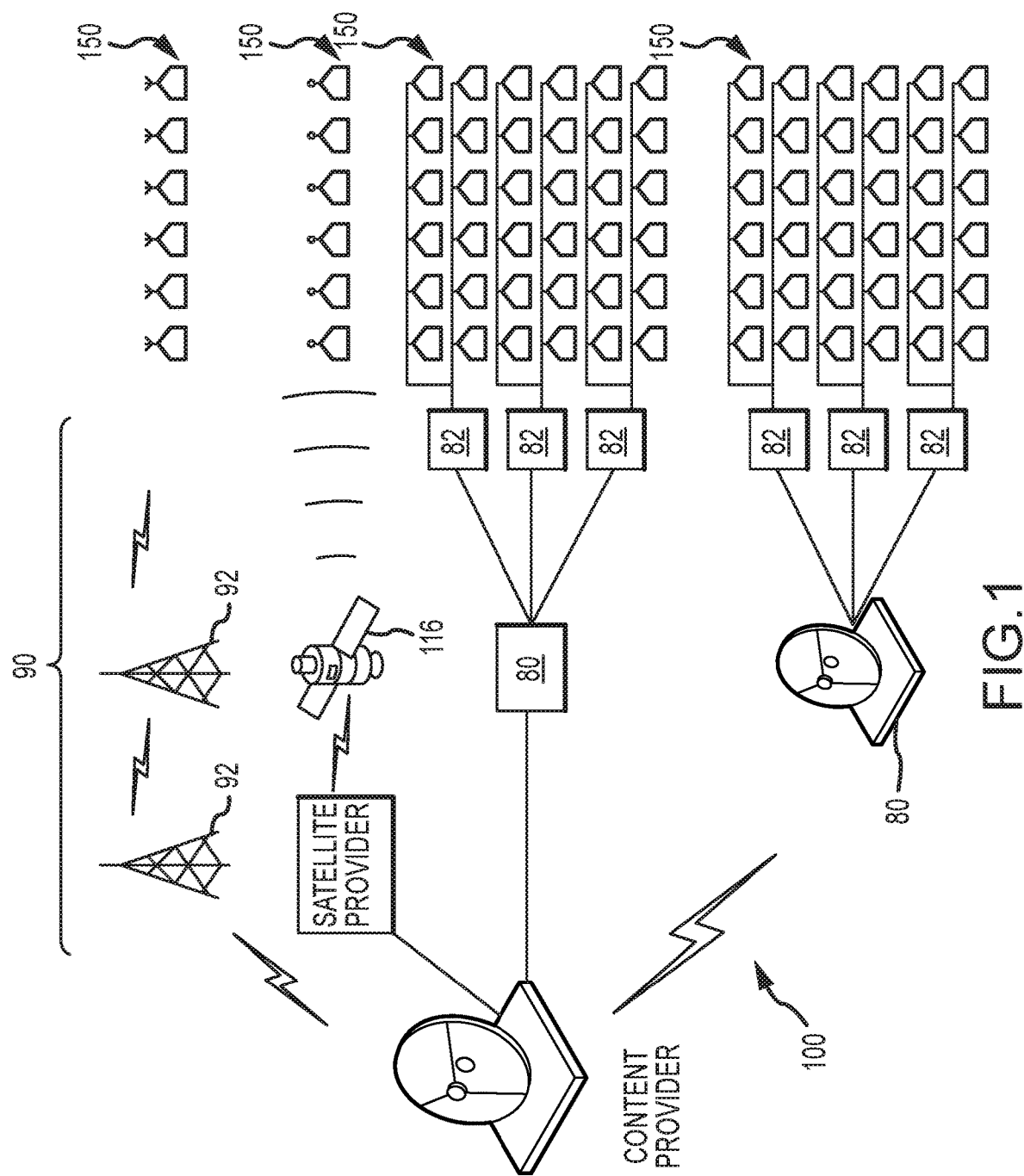
FIG. 1 illustrates a broadcast network.

For purposes of illustration, the invention is described in some instances below in the context of cable television network implementations. Components of exemplary cable television networks 100 are depicted in FIG. 1 where different modalities are utilized to deliver broadcast content to network users. In the illustrated network 100, broadcast content is distributed to network users via a plurality of network platforms 90. Such network platforms may vary by region, broadcast network and/or nationality. In one arrangement, the network platforms include repeater stations 92 or satellites 116 that receive broadcast content (e.g., directly, over-air and/or via satellite transmissions) and repeat broadcast the content stream to network users/households 150. In another arrangement, the broadcast network provides broadcast content via a series of network platforms.

Such a series of network platforms may include regional/central network platforms as well local platforms. In a cable television network context, such regional/central network platforms may be represented by regional head ends 80. Each of the regional head ends may be operative to provide broadcast content (e.g., primary distribution) to a plurality of local head ends 82. Such local head ends 82 may then provide content (e.g., secondary distribution) to network users 150.

Generally, the network platforms 90 process received content for transmission to network users. Among other things, the network platforms may be operative to amplify, convert and otherwise process the broadcast content signals as well as to combine the signals into a common cable for transmission to network users 150, e.g., individual households. The network platforms can also process signals from users in a variety of contexts. The network platforms may thus be thought of as the control centers or local control centers of the cable television network 100. It will also be appreciated that local head ends may also be operative to insert local content from local content providers (e.g., local television stations) and/or local asset providers. In any case, the broadcast signal is processed by user equipment devices of the network users, which may include a television, data terminal, a digital set top box, DVR or other terminal equipment. It will be appreciated that digital or analog signals may be involved in this regard.

Users employ the network, and network operators derive revenue, based on delivery of desirable content or programming. The stakeholders in this regard include programming providers, asset providers such as network-wide advertisers (who may be the same as or different than the programming providers), network operators such as Multiple Systems Operators (MSOs), local asset providers and users—or viewers in the case of television networks. All of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Network operators and asset providers can benefit from increased value of the network as an asset delivery mechanism and, thus, potentially enhanced revenues.

Historically, broadcast content from a content provider has included programming and interleaved assets, which asset providers have paid to have included with the programming of the content providers. These interleaved assets have been disseminated in a content stream along with the programming of the content provider. In addition, content providers have historically provided one or more cues within the content stream (e.g., programming and interleaved national assets) to allow local network platforms to insert local assets (e.g., replace a default ad in the content stream with a local ad).

What programming is available on particular channels or other bandwidth segments at particular times is determined by scheduling. Thus, in the context of a broadcast television network, individual programming networks (e.g., content providers), associated with particular programming channels, will generally develop a programming schedule well into the future, e.g., weeks or months in advance. This programming schedule is generally published to users so that users can find programs of interest. In addition, this programming schedule is used by asset providers to select desired asset delivery spots. Asset delivery is also scheduled. That is, breaks are typically built into or otherwise provided in programming content. In the case of recorded content, the breaks are pre-defined. Even in the case of live broadcasts, breaks are built-in. Thus, the number and duration of breaks is typically known in advance, though the exact timing of the breaks may vary to some extent.

Conventional broadcast networks may include asset-supported and premium content channels/networks. As noted above, programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time-slot buys. Specifically, asset providers generally identify a particular program or time-slot on a particular network where they desire their assets to be aired. The cost for the airing of the asset depends on a number of factors, but one primary factor is the size of the audience for the programming in connection with which the asset is aired. Thus, the standard pricing model is based on the cost per thousand viewers (CPM). The size of the audience is generally determined based on ratings. The most common benchmark for establishing these ratings is the system of Nielsen Media Research Corporation (Nielsen).

While the pricing for asset delivery primarily depends on the size of the viewing audience, other factors may be factored in as well. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. This results in significant inefficiencies due to poor matching of the audience to the desired demographics.

For example, even if ratings analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities. In instances where different assets may be targeted to different households or individual users within the households for a given time slot, the inefficiencies may be reduced.

Various asset targeting systems have been proposed in the context of targeting ads to individual network users in a cable television network. In one implementation, the asset targeting system is capable of determining classification parameters of a current viewer. Specifically, the system analyzes a click stream (remote control or other inputs) from the user and, optionally, other information to determine demographic or other information regarding the current user. This information can be reported to a network platform via the broadcast network such that it may be used to identify appropriate ads for an upcoming commercial spot in a process called voting. Additionally, this information can be used to select an appropriate ad, from a set of ads available for a given commercial spot, to be delivered at a set top box ("STB"). The ads that are actually delivered at the STB television can be reported to the network. Such asset targeting systems are described in co-pending U.S. patent application Ser. Nos. 11/331,835, 11/332,771, 11/332,773, 11/332,770, 11/332,772, 11/743,540 and 11/743,544 all of which are incorporated herein by reference.

Such targeting processes may be resource intensive and in many environments such a voting process may not be feasible or desirable. That is, there are a number of situations in which it may be desired or necessary to function with more limited resources for use by an asset targeting system. For example, in some cases, such as a satellite television network, there may be very limited or no opportunity to use a real-time return channel for communications from user equipment devices (e.g., STB) to the network. Accordingly, it may not be practical to implement real-time voting and reporting processes as described above.

In addition, in some cases the resources available at the STB may be limited. For example, other applications or constraints imposed by network providers may limit the STB resources that can be utilized by the targeted asset system. In such cases, it may be necessary or useful to employ reduced functionality or to shift functionality implementation from the STB to another network platform. Finally, in some cases, a network provider or other party operating the targeted asset system may be content to implement targeting on a household basis rather than based on a determination regarding who is currently using the network. In such cases, it may be elected to implement a targeted asset system with reduced functionality or to re-distribute functionality across the network.

The present invention provides targeted asset system implementations useful in the noted contexts while enabling the targeting of assets as provided to individual households and/or users within these households. In the following description, an inventive household classifier system is set forth in the context of a satellite television network, which is an apt environment for implementing the system. However, it will be appreciated that various aspects of the invention can be implemented in other environments where resources are limited or where it is not desired to use a resource intensive targeted advertising system.

Figure 2:
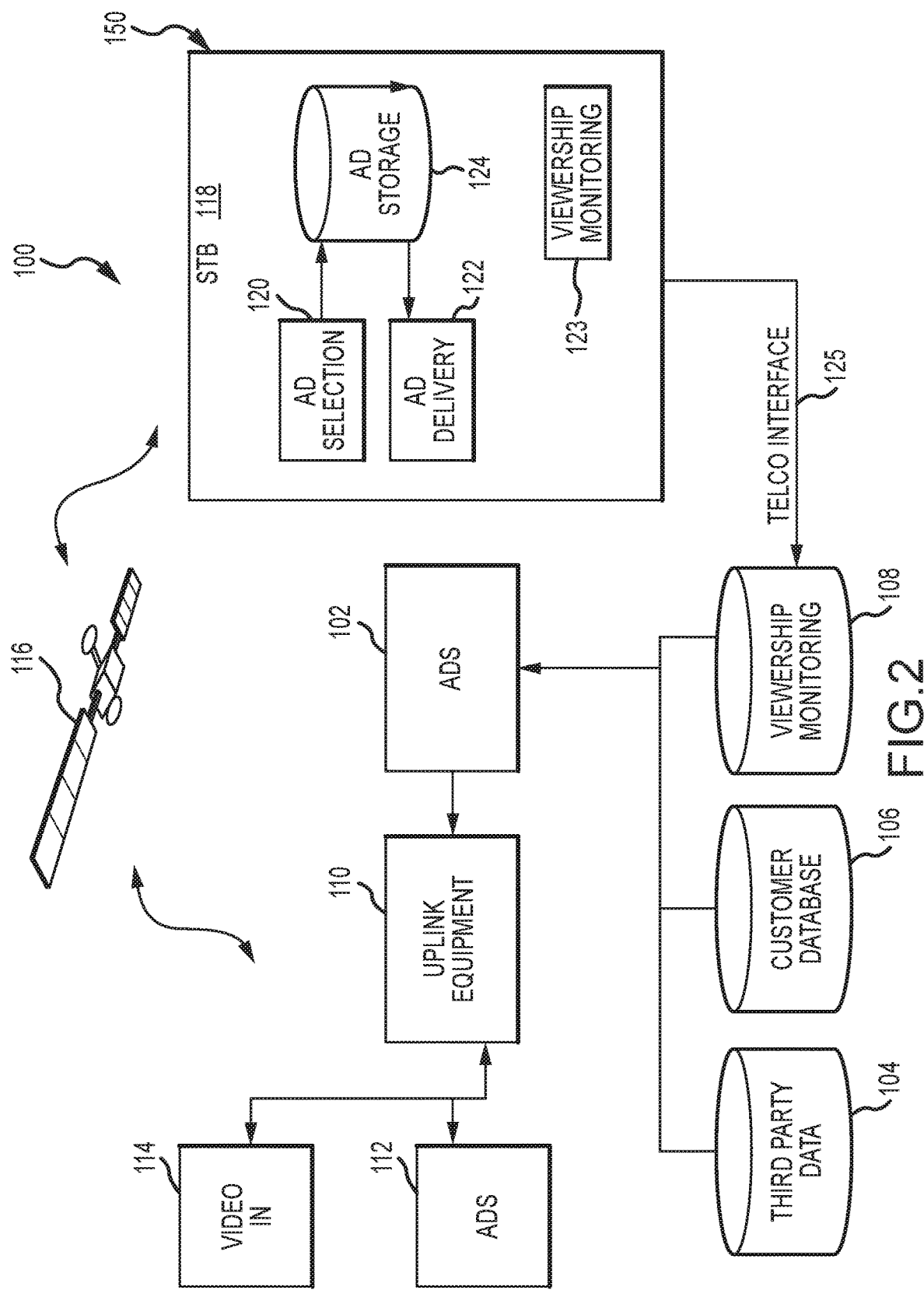
FIG. 2 illustrates one embodiment of a household targeting asset delivery system.

Referring to FIG. 2, a satellite television network 100 implementing a targeted asset system in accordance with the present invention is illustrated. The system 100 generally includes uplink equipment 110 and associated components and a STB 118, which is generally disposed at the customer premises of a network user or household 150. The uplink equipment 110 is operative to upload data, including video content, ads and network data, to a satellite system 116. The data is then delivered by the satellite system 116 to the STB 118, for example, via a satellite dish.

In the illustrated example, much of the functionality of the targeted asset system is implemented by an ad decision system (ADS) 102 associated with the uplink equipment 110. In particular, the ADS 102 is operative for determining user classification information for particular users' STBs or households, which is used to control delivery of targeted assets at the STB 118. In this case, the ADS 102 receives input information from a third party database 104, a customer database 106 and a viewership monitoring database 108. The customer database 106 includes a variety of information regarding individual viewers or households, such as the location of the household, the name or names of users and demographic information regarding the users. Such customer databases may include network provider customer databases that may include information regarding network subscribers. Customer databases may also include databases of asset providers. Such asset provider databases may provide highly detailed information regarding previous customers of the asset providers. It will be appreciated that such databases may be proprietary and use of such data may be limited to targeting the assets of the asset provider who owns the database.

The third party database(s) 104 can provide very rich information regarding individual network users. For example, the third party database 104 may include credit card transactions or other purchasing decision information indexed to individual network users or households. Such third party databases may be provided by data providers and may group like households into like predefined groups. Alternatively, third party databases may be associated with data providers who provide detailed information regarding individuals of a household. For instance, some data providers obtain DMV database information. In such a third party database, information regarding the sex, height, weight, eyesight, etc. of a named member of a household may be available. Based on any combination of this information, it may be possible to obtain actual or deduce putative demographic information about individual users of a household. For instance, it may be possible to determine the actual membership and/or composition of a household (e.g., mother 36, father 42, two children 6 and 8, girls etc.). Such information may be correlated with, for example, purchasing information for members of the household. This may allow for identifying products and/or services that are of interest to the members of the household.

The viewership-monitoring database 108 provides information based on specific programs or other content selected for viewing by individual users or households. In this regard, information may be reported from the STB 118 via an interface 125 that may be the same as or different from the interface through which broadcast content is received. Such an interface may include, without limitations, a Telco interface and/or an Internet interface. Reporting information may also be provided via this interface 125. It will be appreciated that, in some cases, this information may only be made available on a periodic basis, e.g., daily, weekly, etc. Accordingly, such information may not allow for real-time identification of a current network user and, as a practical matter, may be limited to information regarding an STB or a household as opposed to individual users.

Based on all of this information, the ADS 102 can determine or infer classification parameters for individual users and/or households. This classification information or classifier may be indexed to an identifier for the individual user or household, and this information may be provided to the uplink equipment 110 for transmission to the STB 118. Accordingly, the STB 118 may store this classifier(s) for subsequent use.

The uplink equipment also receives video inputs from various sources and ad content 112 that may be transmitted to the STBs 118. For example, video streams for multiple programming channels may be delivered to the STB. In the context of the present invention, the ad content 112 may include multiple ad options for any given commercial spot on any given ad supported programming channel. The ad content 112 may further include metadata identifying the target audience for each ad. Accordingly, the information received at the STB 118 includes, in addition to the video content for the various programming channels, ad options for any ad spot for which targeted asset delivery is supported, metadata identifying the target audience for each such ad and classification information characterizing a user or household associated with the STB 118. However, it will be appreciated that the ads need not be transmitted in real-time. That is, ads may be forwarded to the STB 118 and stored in advance of a commercial spot where the ad is available for delivery (e.g., using processes such as currently used for delivering VOD content). In addition, the classification information for the STB 118 may be forwarded to the STB 118 on a periodic basis, e.g., daily or after any viewership update received via the interface 125.

In the illustrated implementation, it is assumed that the STB 118 has substantial resources available for storage, e.g., the STB 118 is a DVR box. In addition, it is assumed that the STB 118 has sufficient processing resources available to run a small application for implementing certain targeted asset system functionality, as described below. In the illustrated embodiment, the STB 118 includes an ad selection module 120, an ad delivery module 122, storage 124 that can be used for storing ad options until a time of delivery and a viewership monitoring module 123. The ad selection module 120 is operative for selecting ads to be stored in ad storage 124. Specifically, in the illustrated implementation, the STB 118 receives all of the ad options for a given commercial spot, as well as metadata identifying the target audience for each of the ads, and classifier(s) specific to the STB 118. The ad selection module 120 uses the classifier(s) and the target audience information to select ads that are appropriate for the STB 118. These ads are stored in ad storage 124. Other ads may be discarded to conserve storage resources. This selection process is implemented by matching the classification parameters associated with the classifier(s) to the target audience information, as described in the patent applications incorporated above.

The ad delivery module 122 is operative to identify any ad delivery opportunity and deliver an appropriate ad. In this regard, the ad delivery module 122 monitors the current programming channel being used by the user, identifies any upcoming commercial spot for which targeted asset delivery is desired on that programming channel, identifies an appropriate ad for delivery, retrieves the ad from storage 124 and delivers the ad to viewers on the associated television at the commercial spot. In this regard, metadata associated with the ads may identify the commercial spots for which the ad can be delivered. If more than one ad is available for a given spot, appropriate logic may be executed to make a decision. For example, the ad to be delivered may be selected based on a lottery or rotating basis, or the highest value ad may be inserted. Additional implementation details regarding the ad delivery module are described in the patent applications incorporated above.

The viewership-monitoring module 123 is operative for monitoring viewership and reporting this information to the network via the interface 125. For example, program selections may be recorded based on a click stream from a user remote control or signals from a user television. This information may be reported periodically, e.g., on a daily or weekly basis, and individual selections may be reported or the information may be aggregated or summarized. It will be appreciated that certain households may include more than one STB 118. In such cases, the noted functionality may be separately implemented for each STB 118. It will be appreciated that the STB in a parent's bedroom may be associated with different classification parameters than an STB associated with a living room television or children's bedroom television.

The system described above provides a high level of functionality in context where resources are limited. In particular, the system allows for substantial targeting functionality despite the limited availability of viewership monitoring information. In addition, the system noted above requires minimal resources at the STB as much of the functionality is implemented in connection with the uplink equipment.

Figure 3:
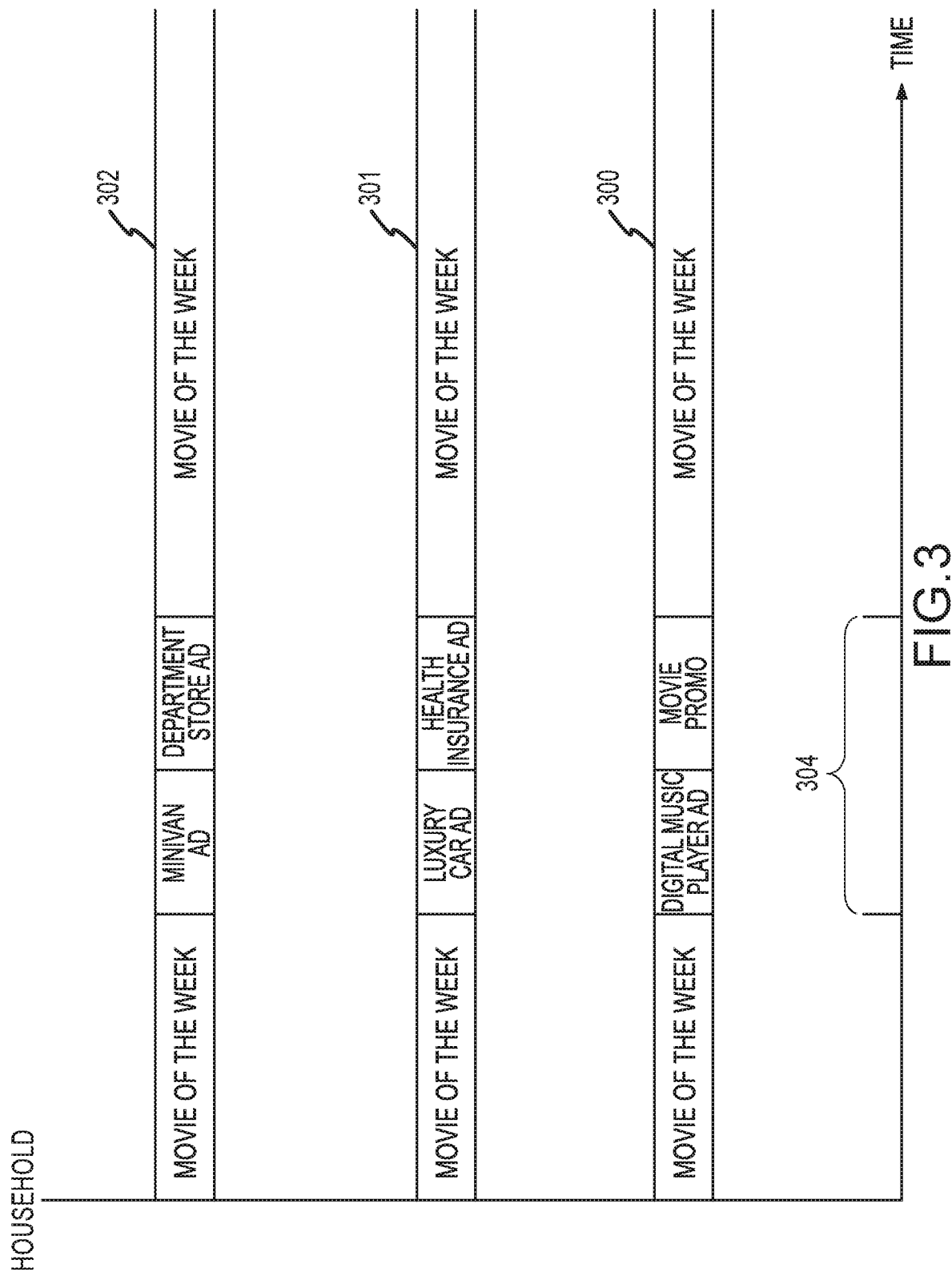
FIG. 3 illustrates replacement of assets assts in a common programming channel received by different households.

FIG. 3 illustrates application of a targeted asset delivery system implemented in accordance with aspects of the present invention. As shown, FIG. 3 illustrates the dissemination of different assets, in this case ads, in broadcast content streams of different households 300-302 of a broadcast network where network users are watching the same programming channel. As shown, three different households 300-302 are depicted as receiving the same programming, in this case, denoted "Movie of the Week." At a given break 304, the STB of each individual household may each provide a different asset package based on the classification(s) of the household. For instance, a first household 302 may be classified as a family with young children. Accordingly, their STB may select assets targeted to their demographics group (e.g., minivan ad and department store ad). In contrast, a second household 301 (e.g., high net worth) may receive different assets (e.g., luxury car ads, etc.) during the break 304. Likewise, a third household 300 may receive assets targeted to, e.g., an under 24 demographic group.

Alternatively, instead of representing three separate households 300-302, FIG. 3 may illustrate application of a targeted asset delivery system implemented to different user equipment devices or STBs within a single household. In such an arrangement, each user equipment device 300-302 may be receiving the same programming. However, each user equipment device may be implemented to target a specific individual within the household. It has been recognized that in most households with multiple user equipment devices (e.g., multi-television households), that each user equipment device is utilized by a dominant user/viewer. In this regard, parents may be the dominant viewer of television within their bedroom, the mother may be a dominant viewer of the television in the family room, and the children of the household may be the dominant viewer(s) of a television in a recreational room. Accordingly, each of the user equipment devices 300-302 may be classified to provide assets that may be directed towards the dominant viewer of the particular user equipment device of the household.

Figure 4:
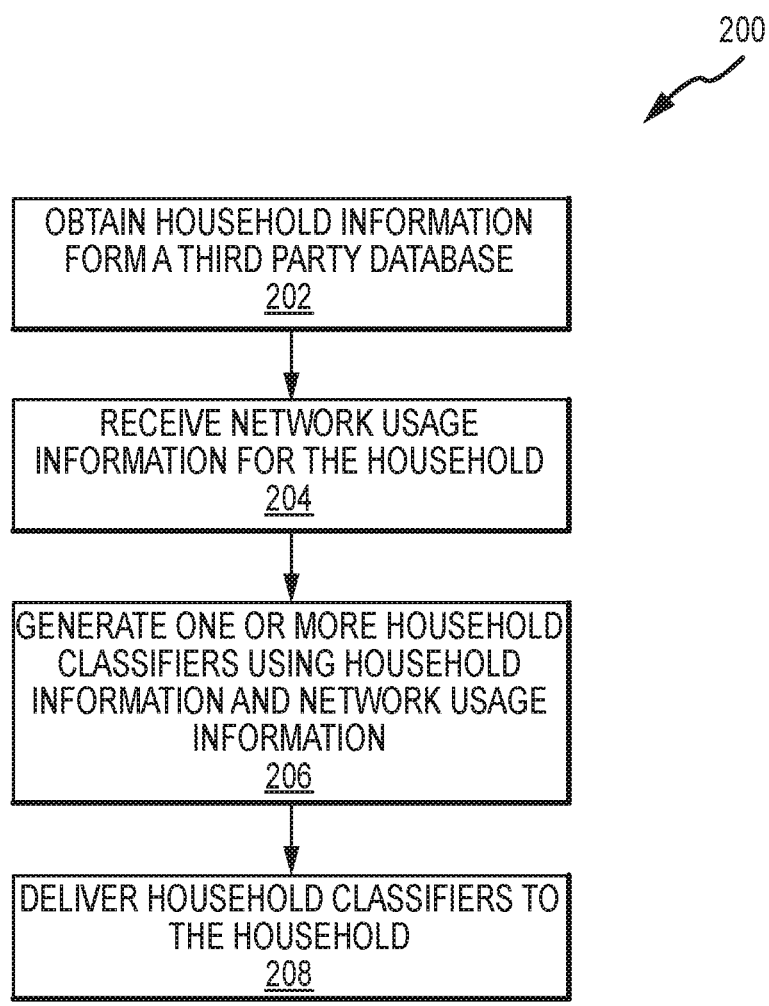
FIG. 4 illustrates one asset targeting process that may be implements by the system of FIG. 2.

FIG. 4 illustrates a process 200 that may be implemented by the ad decision system 102 of FIG. 2 or by similar systems in other network configurations. Initially, the ADS system obtains 202 household information from one or more data repositories. Such data repositories may include third party databases as discussed above. Further, the ADS system receives 204 network usage information for the household from which the household information was obtained. Such network usage information may be obtained from a viewership monitoring database that is accessible via the network. In this regard, individual households/STBs may report to such a monitoring database. The household information and network usage information may then be utilized to generate 206 one or more household classifiers based on the household information and the network usage information. It will be appreciated that in certain instances it may be desirable or necessary to utilize additional information such as, for example, customer information (e.g., resident address) from one or more customer databases associated with the broadcast network, to correlate the third party data to the network usage information. In any case, once the classifier(s) are generated 206, they may be delivered 208 to the household via the network interface or potentially through another interface (e.g., Telco, Internet, etc.). In addition, any constraints associated with the classifier(s) may also be delivered to the household. Accordingly, such household classifiers may be stored and/or implemented by the STB of the household.

Figure 5:
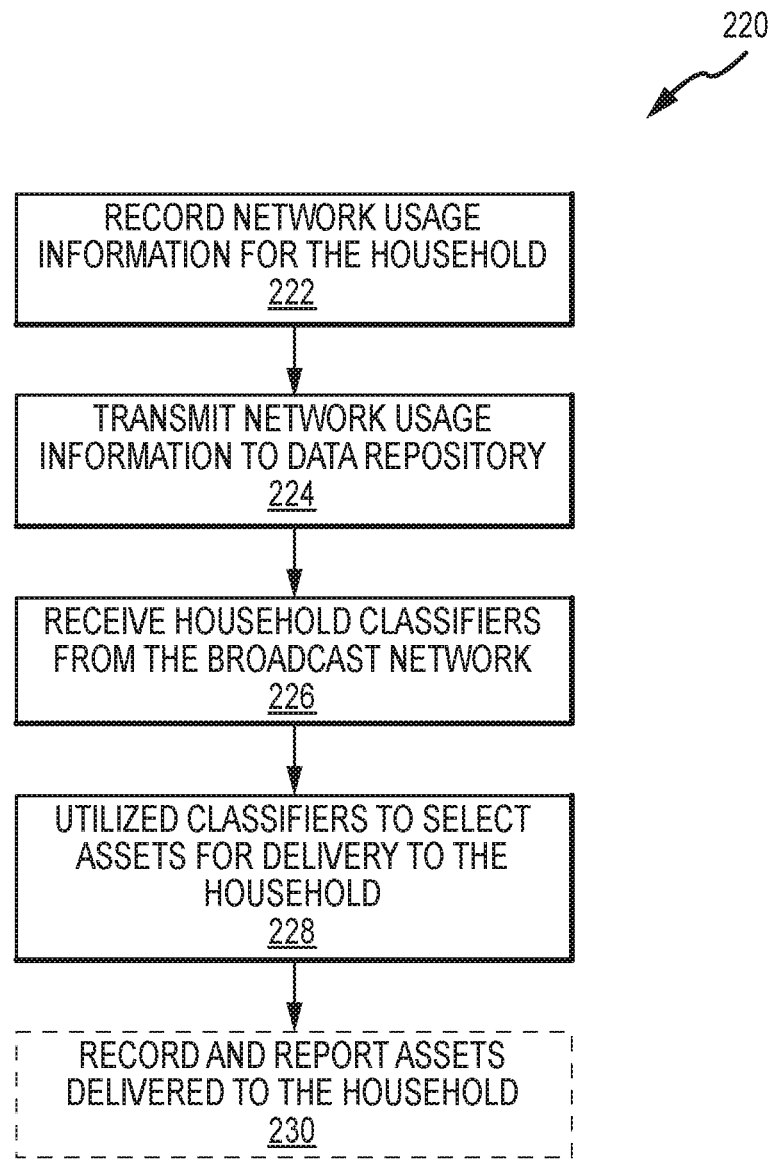
FIG. 5 illustrates one asset targeting process that may be implemented by an STB of a household.

FIG. 5 illustrates a process 220 that may be utilized by an STB to implement various aspects of the present invention. Initially, the STB may record 22 network usage information associated with broadcast content that is output at a household in the broadcast network. Such network usage information may be stored in local storage media at the STB until a predetermined time when the network usage information may be reported to a platform associated with the broadcast network. That is, the STB may be operative to transmit 224 the network usage information to a platform or data repository that is accessible via the broadcast network. Such transmission 224 may be through an interface that is separate from the broadcast network interface associated with the STB, though this is not a requirement. Subsequent to transmitting the network usage information, the STB may receive 226 household classifiers from the network. Such household classifiers may be generated based on the network usage information, which may include program and channel and/or time information, as well as household information associated with the household of the STB. In any case, the STB may be operative to utilize 228 the household classifiers to select assets for delivery with broadcast content output at the household. Such utilization 228 may include selecting assets for storage and subsequent delivery as well as selecting between different asset options that may be transmitted to the household via the broadcast network in separate transmission bands. In a further embodiment, the process may include storing and reporting 230 which assets were delivered to the household by the STB.

However, the system has certain practical limitations. For example, the system described above implements targeting on a household or STB basis and is not generally directed to determining classification parameters regarding a current viewer. That is, much of the discussion above has referenced classifiers as relating to households as opposed to individuals within the households. In a further arrangement, viewing history and third party database information may be utilized to determine multiple classifiers for a single household instead of for generating a single household classifier.

Figure 6:
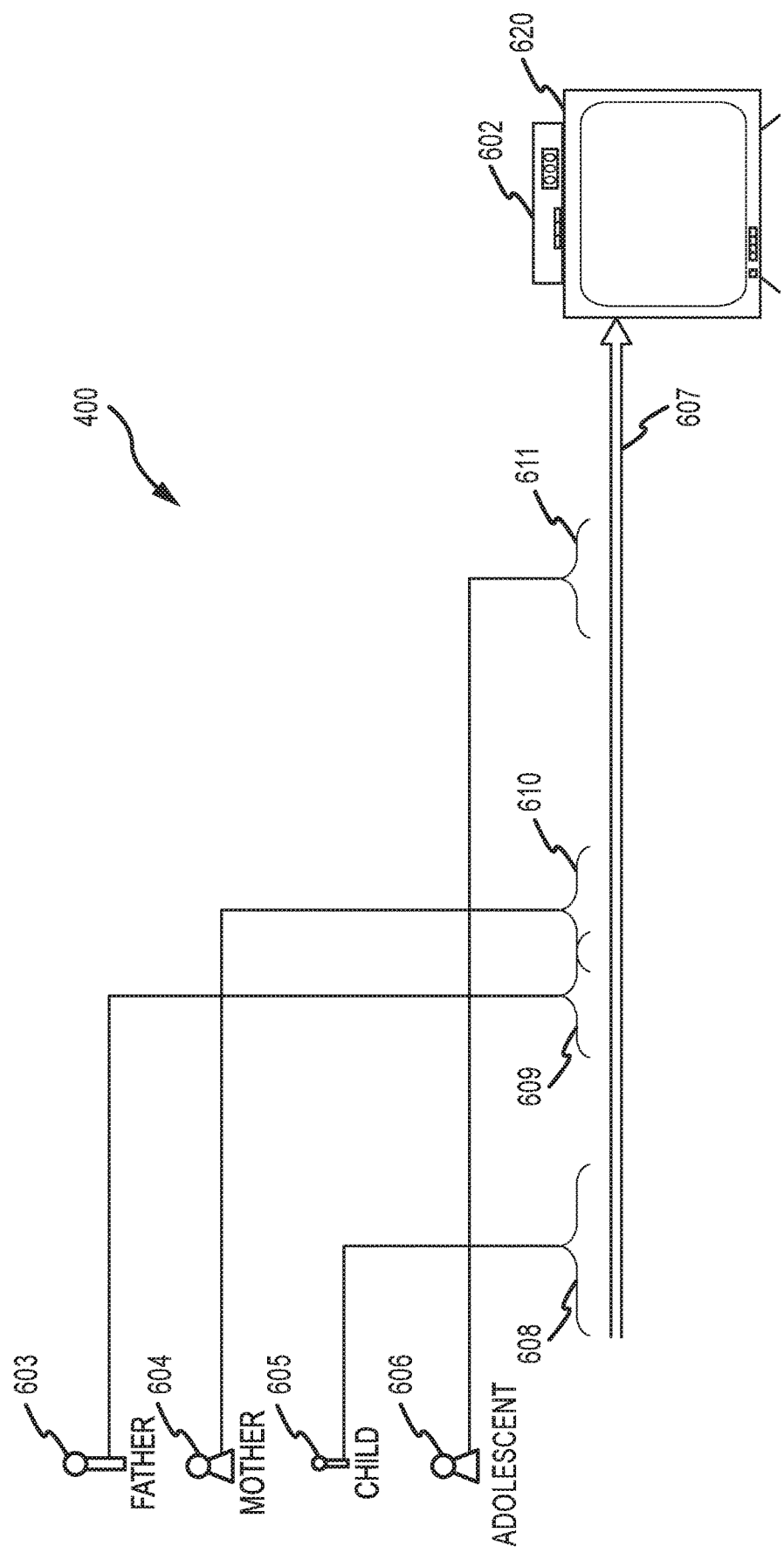
FIG. 6 illustrates network usage of a household.

FIG. 6 illustrates a theoretical example of network usage of a household 600 including a television set 620 and a DSTB 612 that are associated with multiple users 603-606. Arrow 607 represents a timeline during which the television is utilized. A first user 605, in this case a young child, uses the television 620 during a first time period—for example, in the morning. Second and third users 603 and 604 (designated "father" and "mother") use the television during time periods 609 and 610, which may be, for example, in the afternoon or evening. An adolescent child 606 uses the television during a night time period in this example.

This illustrates a number of challenges related to targeted asset delivery using household classification. First, because there are multiple users 603-606, targeting based on household demographics may have limited effectiveness. For example, it may be assumed that the young child 605 and father 603 in most cases would not be targeted by the same asset providers.

These noted difficulties are associated with a number of objectives that are preferably addressed by another embodiment of the targeted asset system of the present invention. First, the system should preferably be operative to record network usage information (e.g., viewership monitoring) of a single set and, in the context of the system described above, report such viewership monitoring to the network at least periodically. Where the viewership monitoring information includes usage times and/or channels watched, this information, in conjunction with third party database information and/or customer information, may allow for generating multiple temporally distinct classifiers for the household 600.

For example, the combination of network usage information and the third party data base information and/or customer information may allow for deducing/estimating the compositions of the members of the household. Likewise, different classifiers may be provided that may be used at different times. That is, a first classifier may be implemented that is directed toward the parents 609, 610 and is utilized between 1 p.m. and 9 p.m. and another classifier may be directed towards an adolescent child 611 and may be implemented between 9 p.m. and 1 a.m.

In such an embodiment, where multiple classifiers are generated for a single household, the system may be operative to forward all classifiers and their temporal limitations to the STB, or, the system may send each classifier as it is to be implemented. In the latter regard, the STB may replace a classifier with an updated classifier.

While it is possible to utilize multiple classifiers with a single household, it is also recognized that a single household may utilize multiple different STBs. In this regard, it may be more desirable to implement different classifiers at different STBs based on who is believed to be the primary/dominant user of the STB. In this regard, multiple classifiers may be generated for a given household based on network usage information from different STBs within the household. Accordingly, the network usage of different STBs may be monitored to identify usage patterns. Based on such usage patterns and, for instance, the putative and/or known members of the household, different classifiers may be selected for different STBs. In one arrangement, a single classifier may be implemented at each STB. That is, a dominant classifier may be utilized by a given STB. In such an arrangement, an output device (e.g., a television) associated with, for example, a teenager's room may always target a demographic below the age of twenty. Likewise, the output device associated with the parents of a household (e.g., within the parents' bedroom) may always be geared towards a demographic associated with, for example, middle-age and/or an income bracket associated with the household. However, it will be appreciated that in addition to implementing a dominant viewer classification, such STBs may utilize one or more classifications that may be associated with temporal limitations.

Figure 7:
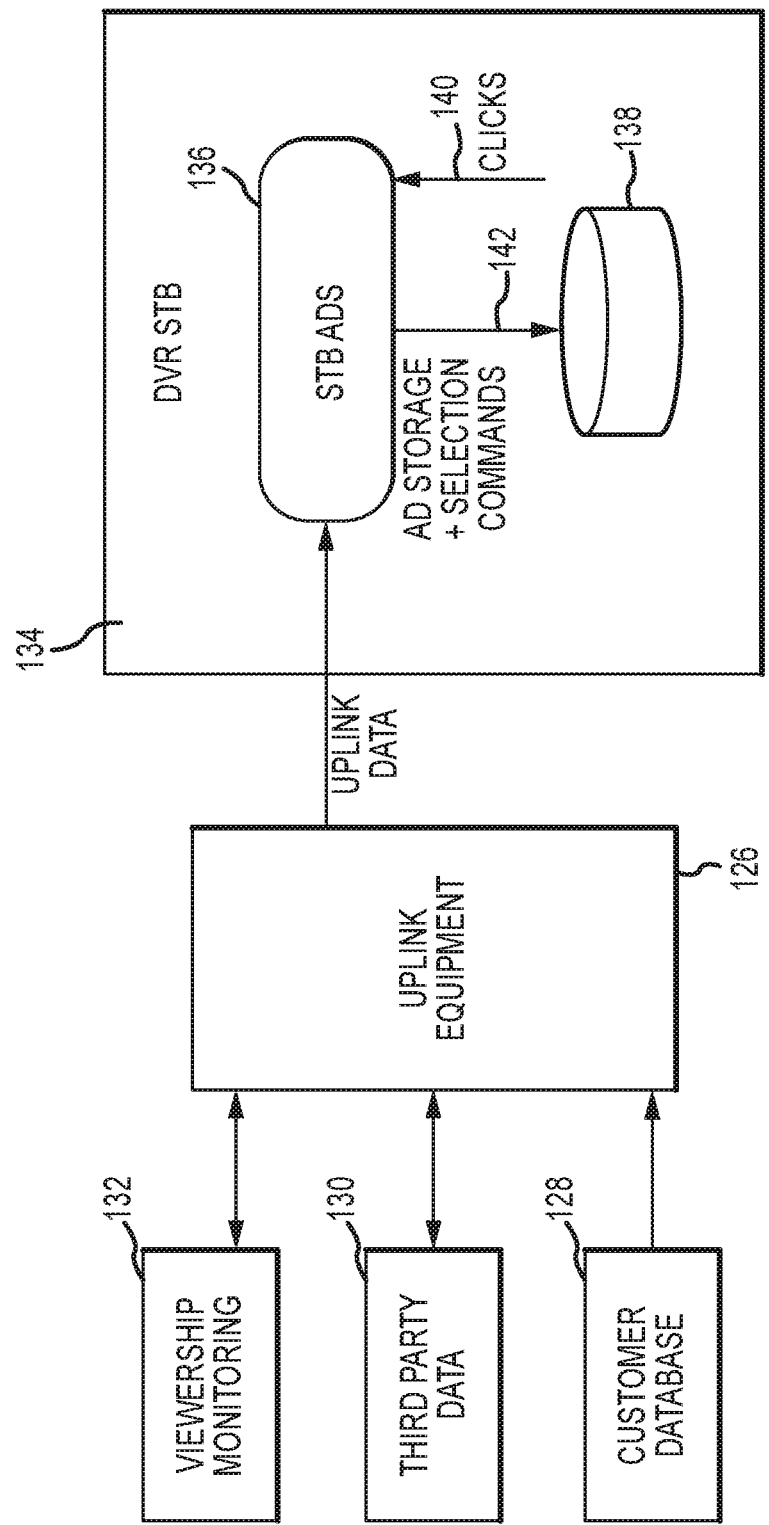
FIG. 7 illustrates another embodiment of a household targeting asset delivery system.

FIG. 7 illustrates an alternative implementation that utilizes additional resources at the STB 134 in order to allow for targeting of assets matched to the current viewer. In this case, the uplink equipment 126 provides programming and advertisements to the DVR STB 134 in conventional fashion. In addition, information may be provided to the STB 134 from a customer database 128 and third party database 130, as described above. Optionally, viewership-monitoring information 132, as described above, may be provided to the STB 134.

The illustrated STB includes an ADS 136 for storing ads and selecting ads for delivery at the user's television. In this case, because the ADS 136 is implemented at the STB 134, the ADS has access to a click stream 140 from the user. Accordingly, the ADS 136 can determine classification parameters in real-time, as described in the patent applications incorporated above. These classification parameters can be used to store appropriate ads in storage 138 and/or to generate selection commands 142 to control ad delivery.

Further, the ability to provide third party data 130, customer database information 128 and/or viewership monitoring information to the STB 134 via the uplink equipment 126 may allow for improving the ability of the STB 134 to determine who is currently utilizing the STB 134. For instance, if third party data and/or customer database information 130, 128 is provided to the STB that allows the STB to know the composition of the members of the household (e.g., actual and/or putative), the ADS 136 may utilize that information in conjunction with the click stream 140 or other inputs from the user to make an identification as to who is currently receiving output from the STB. In this regard, if information about the household is known, a simplified algorithm may be implemented by the ADS for determining the probable current user of the STB.

Figure 7A:
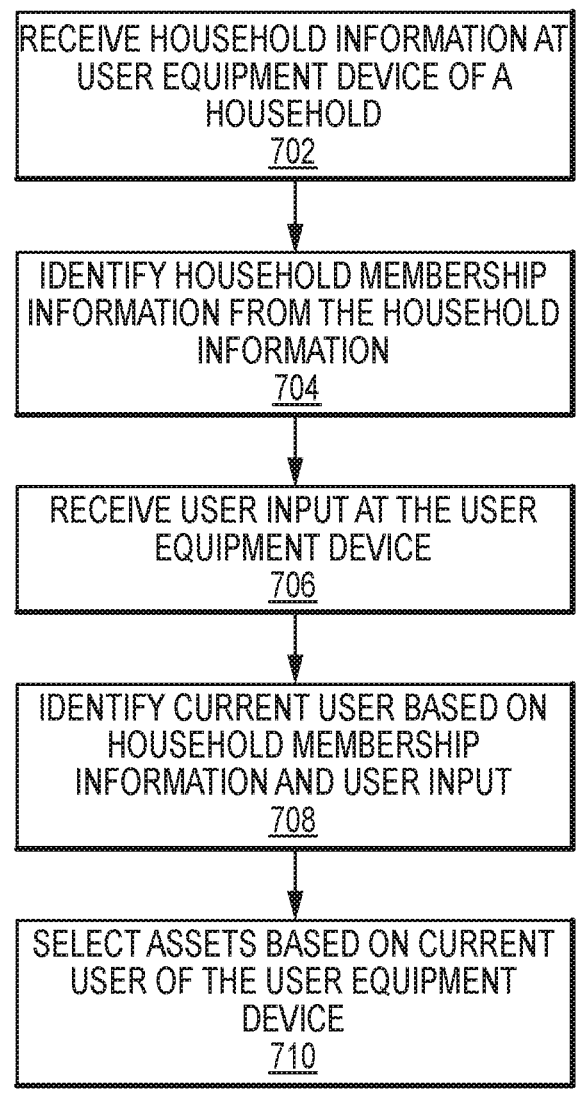
FIG. 7A illustrates one asset targeting process that may be implemented in the system of FIG. 7.

FIG. 7A illustrates a process associated with utilizing household data received at an STB in conjunction with user inputs to identify a current user of the STB. Initially, household information is received 702 at the STB via the network interface. This household information may be stored by local storage media associated with the STB. Algorithms supported by the STB may utilize the received household information to identify 704 household membership information. Such household membership information may provide information as to the composition of the individuals within the household. Subsequently, the STB may receive 706 a click stream 140 from a network user. Based on this click stream and the household membership information, the STB may determine 708 which member of the household is currently utilizing the STB. Once this determination is made, the STB may select 710 assets for display to the current network user. It will be appreciated that the process set forth in FIG. 7A and the system set forth in FIG. 7 may be implemented without utilizing viewership monitoring information. That is, if the actual or putative members of the household may be effectively determined, this information may be forwarded to the STB, which may then implement the selection algorithm based on the user inputs. Further, once a putative or actual household membership is identified, effective targeting may be implemented by the STB without requiring reporting of network usage information. That is, if the STB knows the identity (e.g., demographic identity) of the members of a household, the STB will effectively identify a current network user and thereby provide improved asset targeting.

Classification asset targeting can be implemented using a variety of architectures in accordance with the present invention. Various implementations may involve a forward-and-store functionality. In such instances, a STB may receive assets prior to receiving a content stream. Accordingly, the STB may insert one or more of the stored assets at predetermined times, e.g., in accordance with information provided with the content stream.

Figure 8:
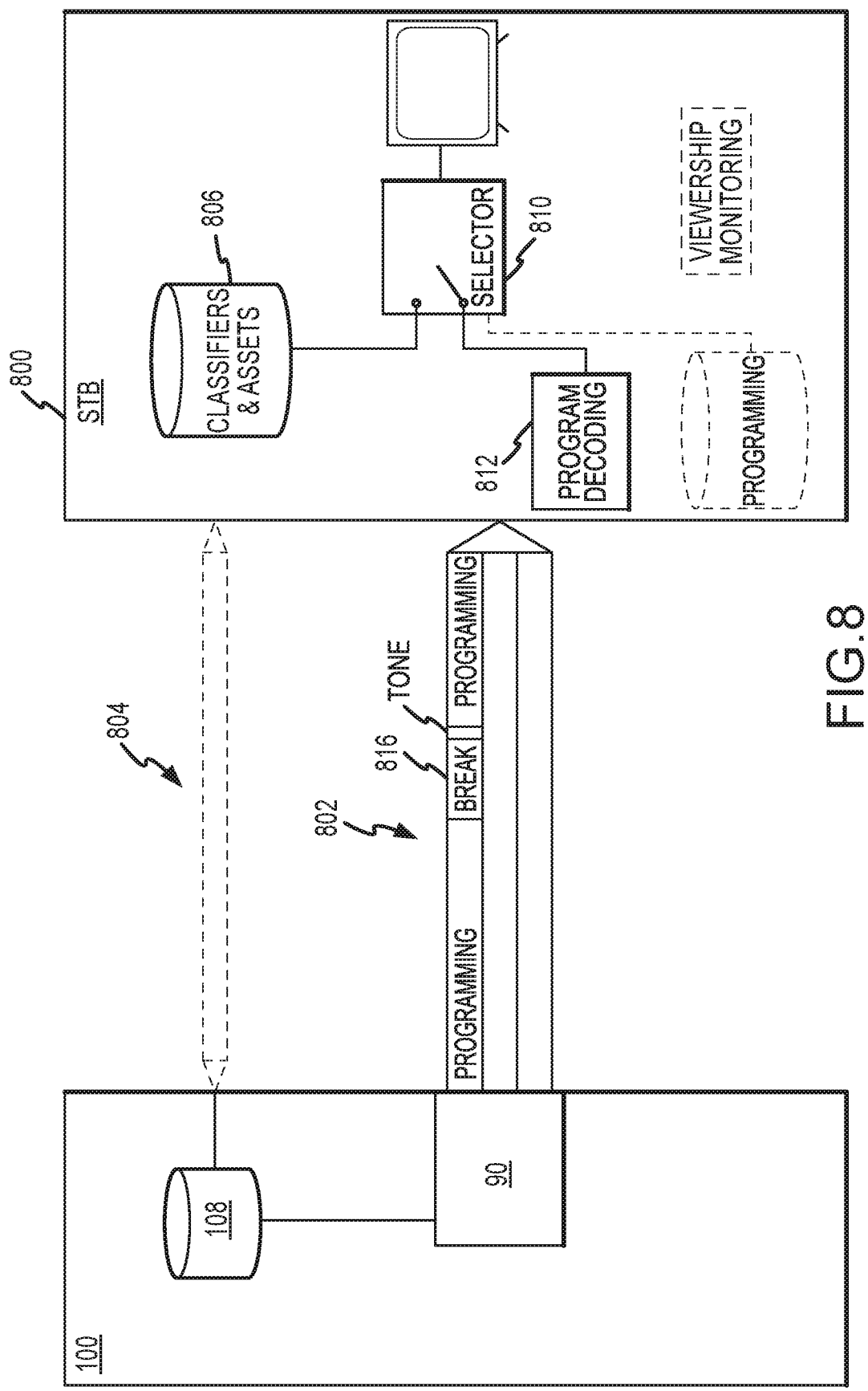
FIG. 8 illustrates a forward and store implementation of the household targeting asset delivery system.

A forward-and-store implementation is illustrated in FIG. 8 that allows an STB to selectively replace a default advertisement within a content stream 802 received by the STB. As shown in FIG. 8, an STB of a household 800 receives a programming stream 802 from a network platform 90. Such a programming stream may be received from any appropriate network platform (e.g., repeater station, satellite, head-end, etc.). In the illustrated implementation, a second communication interface link 804 is established between the household 80 and the broadcast network 100. The second interface 804 may be utilized to deliver network usage information from the STB to a viewership monitoring database 108 accessible by the network 100. However, it will be appreciated that the second interface 804 may alternatively be implemented in a common transmission band as the content stream.

In the illustrated implementation, the content stream 802 is provided to the STB. As shown, programming is provided with an interleaved programming break 816 including at least a first asset delivery spot. This programming break 816 is proceeded by an insertion signal or tone. The STB may include a decoding device 812 that allows for monitoring a received content shown to identify an insertion signal and thereby identifying the time and duration of an upcoming break 816. In addition, the STB may also identify metadata and/or SCTE signals within the content stream 802. Such signals may identify the targeted audience parameters for the default asset included within the programming break 816. Accordingly, the STB may utilize this information in conjunction with one or more stored classifiers to determine whether the default asset included within the programming break 816 is suitable for delivery to the household serviced by the STB or if an alternate asset(s) would be more appropriate. Furthermore, it will be noted that the metadata may also indicate what types of alternate assets may be inserted into the content stream. In instances where it is determined that a different asset may be more appropriate based on the household classification, the STB may utilize a selector 810 switch between the content stream 802 and an asset input stream interconnected to the asset database 806 such that a default asset within the content stream 802 may be replaced with a stored asset deemed more suitable (e.g., based on one or more household classifiers) for delivery with the programming.

Figure 9:
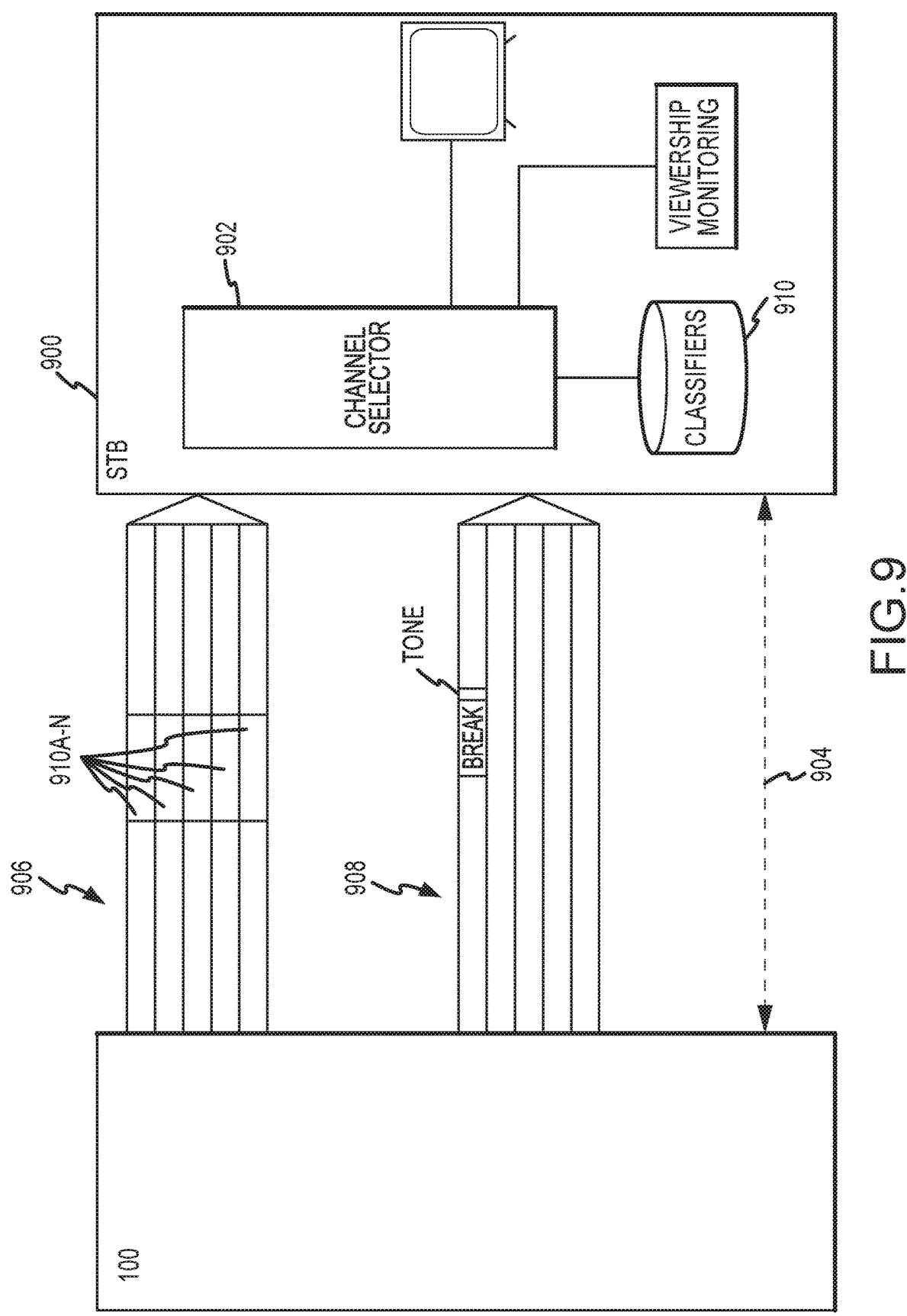
FIG. 9 illustrates a channel hopping implementation of the household targeting asset delivery system.

In another embodiment illustrated in FIG. 9, different targeted assets 906 may be transmitted from a network platform in synchrony with a given break in a content stream 908. In this embodiment, the STB of the household 900 includes a selector 902, which is operative to switch to an asset transmission band associated with a desired asset at the beginning of a break and to return to the programming band at the end of the break. The selector 902 may hop between transmission bands (between asset bands or between an asset band 906 and the programming band 908) during a break to select the most appropriate assets. Such selection may be based on a match between a current classifier 910 and targeting criteria associated with the synchronously provided assets.

In this implementation, the asset options are at least partially provided via separate bandwidth segments. For instance, a first asset option may be provided in the same bandwidth segment as the programming of the content stream and a second (e.g., or third or more) asset option may be provided in a parallel bandwidth segment. This is graphically illustrated in FIG. 9. Such a system for generating and providing parallel bandwidth segments including different targeted assets for selection by a STB device is provided in U.S. patent application Ser. No. 11/332,771, as previously incorporated.

As shown in FIG. 9, a transmission stream is received by a STB. The content stream 908 includes programming and interleaved assets. In the present embodiment, asset insertion breaks in the content stream 908 are provided with two or more asset options 910A-N in the parallel asset band 906. For instance, during the first asset insertion spot in the break, a broadcast platform may provide asset options 910A-N in a parallel transmission band 906 for use in selectively replacing a default asset option included within the primary transmission band 908 (i.e., the band carrying the currently viewed programming).

The asset options 910A-N in the asset band 906 may be targeted towards different demographic groups. In this regard, the STB may be operative to identify asset delivery spots where more than one asset is available. Accordingly, the STB may utilize a selector 902 or tuner to select a transmission band associated with the asset that will be output to network users of the household. Accordingly, the STB may need an indication that an asset delivery spot where more than one asset is available for delivery is upcoming. Accordingly, in the present arrangement, the network platform may insert a signal or tone into the content stream 908 that indicates an upcoming asset delivery spot for which more than one asset is available.

In order to select between upcoming asset options, the STB may also receive information with the content stream 908 (e.g., metadata SCTE signals, etc.) that provides an indication of the content and/or targeted audience for upcoming asset options. Accordingly, the STB may utilize this information with classifier information stored 910 at the STB in order to select an appropriate asset for output to the household. That is, the STB may compare targeting constraints of the upcoming assets with classification information associated with the household receiving the content stream. Accordingly, the STB may select the appropriate asset (e.g., 910A-N) and, if necessary, use the selector 902 to switch transmission bands at the beginning of the asset delivery break if the asset selected is not in the primary transmission band associated with the programming. Likewise, at the end of the asset delivery break, the STB may utilize the selector 902 to switch back to the primary transmission band such that the household 900 switches back to the programming within the content stream.

In either embodiment of FIGS. 8 and 9, the STB may be operative to store information associated with the assets actually delivered (e.g., output) by the STB. Accordingly, this information may be reported (e.g., via the second interface 804 or 904) to the network 100. Such reporting information may be utilized for audience estimation and/or billing purposes as set forth in the applications incorporated above.

While various embodiments of the present invention have been described in detail, further modifications and adaptations of the invention may occur to those skilled in the art. However, it is to be expressly understood that such modifications and adaptations are within the spirit and scope of the present invention.

What is Claimed:

1. An apparatus for use in targeting broadcast network content, comprising:
    1) an input module for:
        a) obtaining household information from at least one third-party information repository for a specific household in said broadcast network, wherein said household information putatively identifies multiple individual members of said specific household; and
        b) receiving network usage information originating from said specific household, wherein said network usage information includes temporal information associated with usage times of at least one user equipment device outputting network content at said specific household and channel information associated with one or more broadcast channels output by said user equipment device;
    2) a household labeling engine for:
        a) based on said information putatively identifying said multiple individual members of said household and said network usage information, determining putative usage times associated with two or more of said individual members;
        b) assigning at least first and second labels associated with two or more individual members of said specific household, wherein said first and second labels are different and include different temporal limitations; and
    3) network interface structure for:
        a) providing said first and second assigned labels to said at least one user equipment device at said specific household; and
        b) providing a plurality of assets to said at least one user equipment device at said specific household for delivery during an asset insertion opportunity in broadcast programming, wherein said user equipment device is operative, based on the temporal limitations of said assigned labels, to utilize one of said first and second assigned labels to select one of said assets.

2. The apparatus of claim 1, wherein said input module is operative for:
    accessing a customer database, wherein said customer database includes customer information associated with said specific household and wherein said assigning further comprises assigning said at least one household classifier based at least in part on said customer information.

3. The apparatus of claim 2, wherein said customer database includes at least one of the following:
    location of individual households;
    one or more names of individuals associated with individual households; and
    demographic information associated with individual households.

4. The apparatus of claim 1, wherein said input module is operative for obtaining purchasing information associated with individuals of said household.

5. The apparatus of claim 1, wherein said input module is operative for obtaining age and gender information associated with said individual members of said household.

6. The apparatus of claim 1, wherein said input module is operative for receiving temporal information associated with usage times of said user equipment device outputting network content.

7. The apparatus of claim 1, wherein said temporal limitations are delivered with said classifiers and wherein said first label is designated for use during a first temporal period and said second label is designated for use during a second temporal period.

8. The apparatus of claim 7, wherein said first and second temporal periods are within a common day.

9. The apparatus of claim 1, wherein said input module is operative for receiving network usage information via a communications interface that is separate from said broadcast network.

10. The apparatus of claim 9, wherein said communications interface comprises a Telco interface.

11. The apparatus of claim 1, wherein said input module is operative for:
    receiving at least first and second sets of network usage information, wherein said first and second sets are of network usage information are associated with first and second different user equipment devices of said specific household.

12. The apparatus of claim 11, wherein said household labeling engine is operative for:
    assigning said second labels to said first and second different user equipment devices.

13. The apparatus of claim 1, wherein said household labeling engine is operative for:
    utilizing said network usage information in conjunction with demographic information associated with each of the multiple individual members of said specific household to identify putative usage times for each individual member of said specific household.

14. An apparatus for use in targeting broadcast network content, comprising:
    1) a network platform for processing household labels for delivery to user equipment devices in the broadcast network;
    2) an input module for:
        a) obtaining, at said network platform, household information from at least one third-party information repository for a household in said broadcast network wherein said household information putatively identifies multiple individual members of said household; and b) receiving, at said network platform, network usage information originating from said household, wherein said network usage information includes temporal information associated with usage times of at least one user equipment device outputting network content at said household;

3) a household label engine for:

a) generating a plurality of household labels associated with putative individual members of said household based on said household information and said usage times; and selecting one of said plurality of household labels based on said current network usage information, wherein said selected household label is delivered to at least one user equipment device at said household; and network interface structure for delivering, during an asset insertion opportunity in broadcast programming, via said broadcast network a plurality of asset transmission bands each including a separate asset, wherein said user equipment device is operative to utilize said selected household classifier to tune to one of said plurality of asset transmission bands to deliver an asset to said household.

15. The apparatus of claim 14, wherein said input module is operative for:

receiving said usage information from said user equipment device via a broadcast network interface utilized to deliver broadcast content to said household.

* * * * *